US011288408B2

(12) United States Patent
Buesser et al.

(10) Patent No.: US 11,288,408 B2
(45) Date of Patent: Mar. 29, 2022

(54) PROVIDING ADVERSARIAL PROTECTION FOR ELECTRONIC SCREEN DISPLAYS

(71) Applicant: INTERNATIONAL BUSINESS MACHINES CORPORATION, Armonk, NY (US)

(72) Inventors: Beat Buesser, Ashtown (IE); Maria-Irina Nicolae, Dublin (IE); Ambrish Rawat, Dublin (IE); Mathieu Sinn, Dublin (IE); Ngoc Minh Tran, Dublin (IE); Martin Wistuba, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 16/601,459

(22) Filed: Oct. 14, 2019

(65) Prior Publication Data

US 2021/0110071 A1 Apr. 15, 2021

(51) Int. Cl.
*G06F 21/84* (2013.01)

(52) U.S. Cl.
CPC .................................... *G06F 21/84* (2013.01)

(58) Field of Classification Search
CPC ............ G06F 21/84; G06F 21/16; H04N 1/32
See application file for complete search history.

(56) References Cited

U.S. PATENT DOCUMENTS 9,246,502 B2 * 1/2016 Yamamoto .......... H03M 1/0863
9,779,474 B2 * 10/2017 Kominar ................. G09G 5/00
10,284,885 B1 * 5/2019 Borras ............. H04N 21/23476
10,459,976 B2 * 10/2019 Wang .................... G06F 3/0488
10,902,543 B2 * 1/2021 Kakkirala ............... G06T 1/005
2014/0002745 A1 * 1/2014 Seshadrinathan ...... H04N 19/86 348/606
2015/0373235 A1 * 12/2015 Chiang ................... G06T 5/002 348/241
2018/0107887 A1 * 4/2018 Huber, Jr. .......... G06K 9/00442
2018/0121635 A1 * 5/2018 Tormasov ............. H04L 9/3297
2019/0087927 A1 * 3/2019 Dewitt ................ G06F 21/6272
2019/0095595 A1 * 3/2019 Coleman ................ G06N 20/00
2019/0132354 A1 5/2019 Akiba
2019/0141414 A1 * 5/2019 Goodes .............. H04N 21/2393
2019/0332850 A1 * 10/2019 Sharma ............. G06K 9/00308
2019/0340466 A1 * 11/2019 Berseth ................ G06K 9/6257
2020/0082097 A1 * 3/2020 Poliakov ............... G06F 21/577
2020/0151505 A1 * 5/2020 Saito .................... G06K 9/6256

(Continued)

FOREIGN PATENT DOCUMENTS

CN 108257116 A 7/2018
KR 20150135652 A 12/2015
WO 2012033583 A1 3/2012

OTHER PUBLICATIONS

"Restricted Evasion Attack: Generation of Restricted-Area Adversarial Example," Kwon et al.,IEEE Access, v. 7, May 9, 2019, pp. 60908-60919, (12 Pages).

*Primary Examiner* — Viral S Lakhia
(74) *Attorney, Agent, or Firm* — Griffiths & Seaton PLLC

(57) ABSTRACT

Embodiments for providing adversarial protection to computing display devices by a processor. Security defenses may be provided on one or more image display devices against automated media analysis by using adversarial noise, an adversarial patch, or a combination thereof.

15 Claims, 9 Drawing Sheets

10
12 COMPUTER SYSTEM SERVER
28 MEMORY
34 STORAGE SYSTEM
30 RAM
32 CACHE
16 PROCESSING UNIT
40
42
18
24 DISPLAY
22 I/O INTERFACE(S)
20 NETWORK ADAPTER
14 EXTERNAL DEVICE(S)

(56) References Cited

U.S. PATENT DOCUMENTS

| | | | | |
|---|---|---|---|---|
| 2020/0234110 | A1* | 7/2020 | Singh | G06N 20/00 |
| 2020/0265271 | A1* | 8/2020 | Zhang | G06K 9/6232 |
| 2020/0302331 | A1* | 9/2020 | Lonij | G06N 20/00 |
| 2021/0026598 | A1* | 1/2021 | Zinsmeyer | G06F 7/08 |

* cited by examiner

PROVIDING ADVERSARIAL PROTECTION FOR ELECTRONIC SCREEN DISPLAYS

BACKGROUND OF THE INVENTION

Field of the Invention

The present invention relates in general to computing systems, and more particularly to, various embodiments for providing adversarial protection for various computer-controlled screen/devices.

Description of the Related Art

In today's society, consumers, businesspersons, educators, and others communicate over a wide variety of mediums in real time, across great distances, and many times without boundaries or borders. The advent of computers and networking technologies have made possible the increase in the quality of life while enhancing day-to-day activities and simplifying the sharing of information. Computing systems can include an Internet of Things (IoT), which is the interconnection of computing devices scattered across the globe using the existing Internet infrastructure. That is, IoT is based on the idea that everyday objects, not just computers and computer networks, can be readable, recognizable, locatable, addressable, and controllable via an IoT communications network (e.g., an ad-hoc system or the Internet). In other words, the IoT can refer to uniquely identifiable devices and their virtual representations in an Internet-like structure. As great strides and advances in technologies come to fruition, the greater the need to make progress in these systems advantageous for efficiency and improvement.

SUMMARY OF THE INVENTION

Various embodiments for providing adversarial protection for various computer-controlled screen/devices by a processor, are provided. In one embodiment, by way of example only, a method for providing adversarial protection for various computer-controlled screen/devices, again by a processor, is provided. Security defenses may be provided on one or more image display devices against automated media analysis by using adversarial noise, an adversarial patch, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
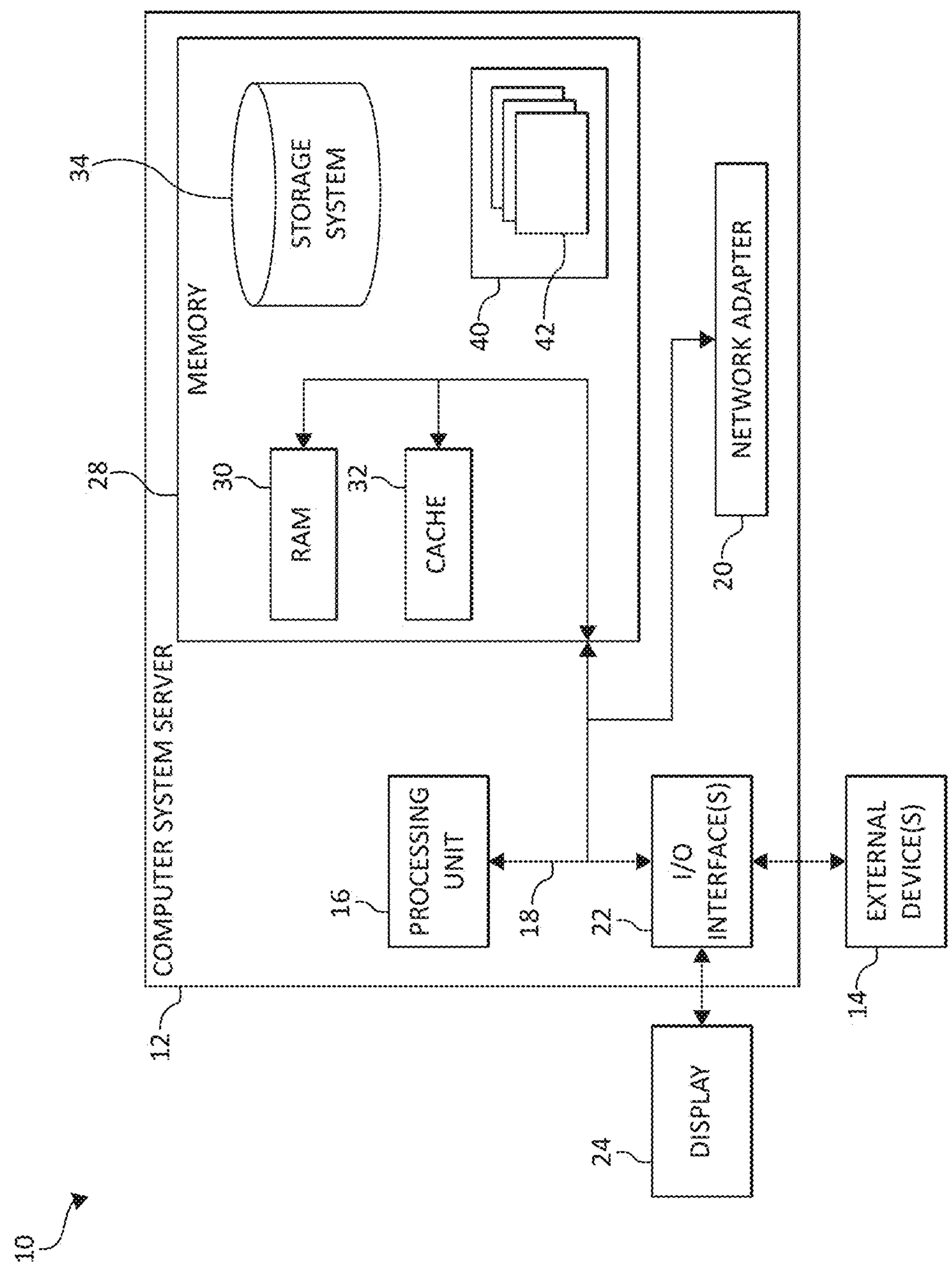
FIG. 1 is a block diagram depicting an exemplary cloud computing node according to an embodiment of the present invention.

Many computing system may include or be associated with various types of electronic screens or display monitors such as, for example, a graphical user interface ("GUI") where such data or images may be displayed. Often times, a user may desire to protect such displayed data from being visible by other persons located within a certain distance or vicinity. Users of these electronic screens or display monitors are afraid of other individuals spying on the data displayed. As such, attempts have been made to provide data privacy by use of some physical privacy system such as, for example, computer screen privacy films. Such protections are important to defend against leakage of certain types of data (e.g., personal information and/or social engineering attacks) as well as counter measures against industrial espionage. However, a current challenge for protecting data displayed on electronic screens or display monitors is when artificial intelligence ("AI") is used to attack the displayed data. For example, with the increase in closed-circuit television ("CCTV") installations (e.g., devices connected through purely secured devices to the Internet-of-Things ("IoT"), in combination with technologies for automated image/video analysis, providing screen privacy against automated espionage through visual means is essential.

Accordingly, mechanisms of the present invention provide useful, novel functionality for providing adversarial protection for various computer-controlled screen/devices, again by a processor. In one aspect, security defenses may be provided on one or more image display devices against automated media analysis by using adversarial noise, an adversarial patch, or a combination thereof. In one aspect, a target or "boundary" region (e.g., an entire portion of the screen/display or one or more selected regions) may be selected from the screen/display for providing the adversarial noise and/or adversarial patch. In one aspect, "Adversarial examples" (or patches, which can be part of an example) are inputs to machine learning models that an attacker has intentionally designed to cause the model to make a mistake. Adversarial noise may be the difference between the adversarial example and the original example. Adding the adversarial noise to a benign example makes it an adversarial example. In one aspect, the adversarial noise may be concentrated in a patch region.

In one aspect, a user may user a computing devices having display/screen (e.g., using a tablet displaying personal/proprietary information on a GUI/screen). The present invention may modify the output of the GUI/screen with adversarial noise in real-time using a continuously looping operation. In one aspect, the adversarial noise is calculated using one or more adversarial attack operations (e.g., black-box adversarial attack operations). The adversarial noise may be added to the current frame of the display/screen.

In an additional aspect, the present invention provides privacy defenses on screens and displays against automated image or video analysis. An adversarial defense (e.g., patch or noise) may be applied to the displayed frame(s). The adversarial noise may be determined, computed, and/or selected. The adversarial patch may be created and/or loaded. A theoretical defense strength may be estimated. An actual defense strength may be estimated through a feedback loop. In one aspect, the actual defense strength can be determined and/or calculated if a feedback loop of an output screen to a computing device and application software exists by feeding the output into an image classifier model and determining the error rate. If the feedback loop is unavailable, a theoretical defense strength may be determined and/or calculated using per-determined and built-in correlation functions created based on experiments on data collected by a device with feedback-loop or by an external recording device.

An expectation over transformation ("EOT") algorithm may be applied and/or evaluated to produce stronger attacks and provide feedback to improve the adversarial defense strength. In one aspect, an EOT is an algorithm to create adversarial examples that remain adversarial over a wide range of transformations (e.g. spatial transformations like rotation, etc., color space changes, etc.). In an additional aspect, the EOT may be used to create adversarial examples which represent an attack. The present invention may use these adversarial examples to defend an electronic screen from being analyzed by image classifiers. In that sense, the present invention may be using an attack on image classifiers to defend the electronic screen.

Additionally, a user may specify, as input, the adversarial defense strength of the adversarial noise/patch that should be applied. The adversarial noise/patch parameters may be determined according the user specified strength. The displayed frame(s) may be transformed as per the obtained adversarial noise/patch.

In this way, the addition of adversarial noise prevents computer systems from automatically parsing and analyzing captures of the display/screen (e.g., obtained from one or more image capturing devices such as, for example, CCTV cameras). The adversarial noise strength may be adjusted (e.g., by a user using an input device and/or a machine learning operation). The noise strength may be increased and/or decreased according to a degree in which the noise strength affects the quality of the screen output. For example, the noise strength may be adjusted to a level (e.g., a small level) that does not notice (e.g., is not aware) a user or 3$^{rd}$ party entity. Alternatively, the noise strength may be adjusted to a level (e.g., a small level) where a user or 3$^{rd}$ party entity perceive artifacts, but would still be able to read the content on the display/screen. It should be noted that larger noise levels nay lead to higher degrees of security (since it becomes more difficult for computer systems to automatically process screen captures). The present invention may also report an estimate of a current defense strength (e.g., similar to battery charging status and may be an estimate of the effectiveness of the current defense strength)).

Thus, the present invention secures and protects data (e.g., personal/proprietary information) against filming devices and automatic analysis of a resulting video or pictures that may be displayed on a screen/display.

It should be noted that data is increasingly processed through a variety of geographically disbursed computing components, where, for example, a local node may contain a set of data processing components yet remain in remote communication with other portions of the distributed data processing system. To wit, an image capturing device and/or an IoT device's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
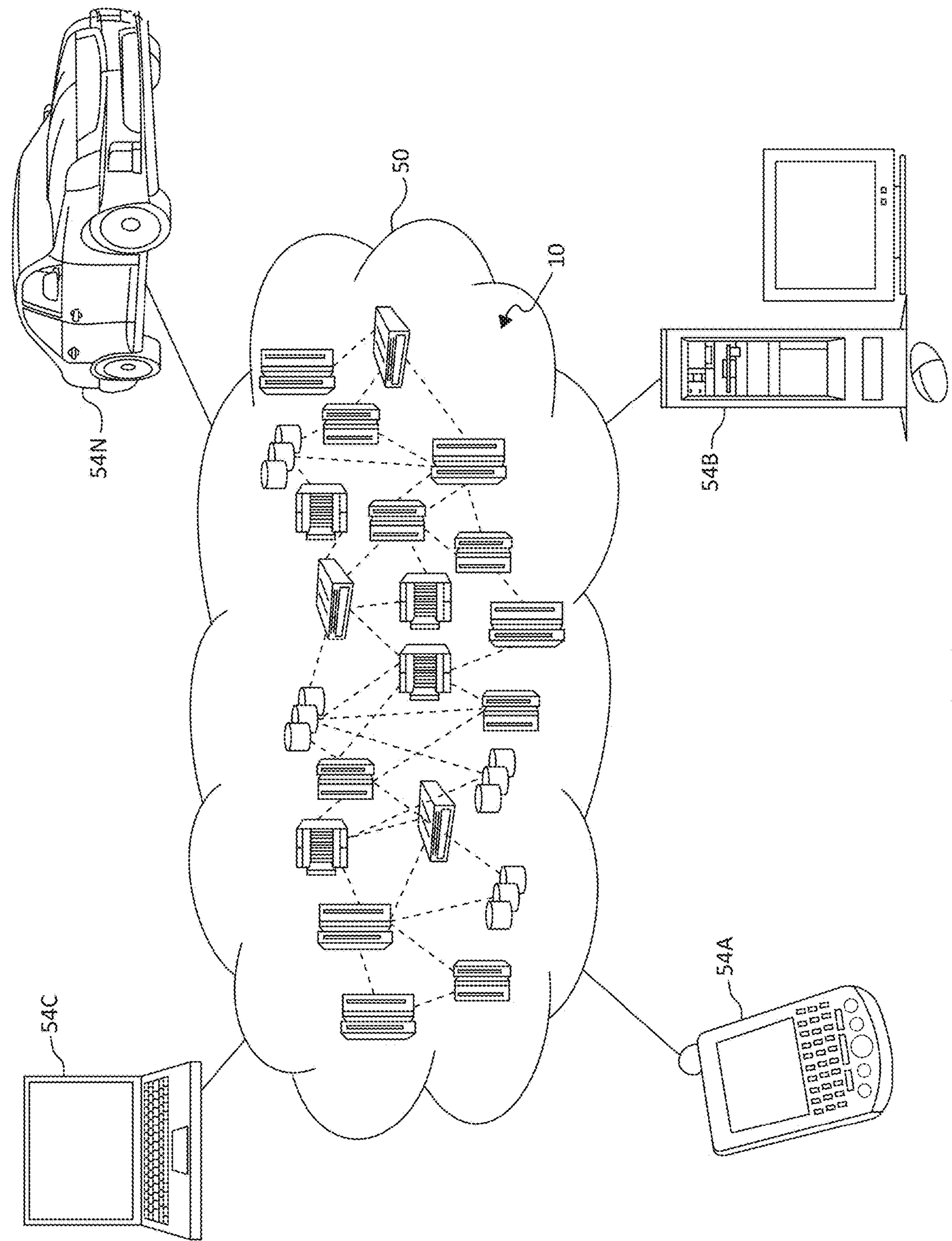
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
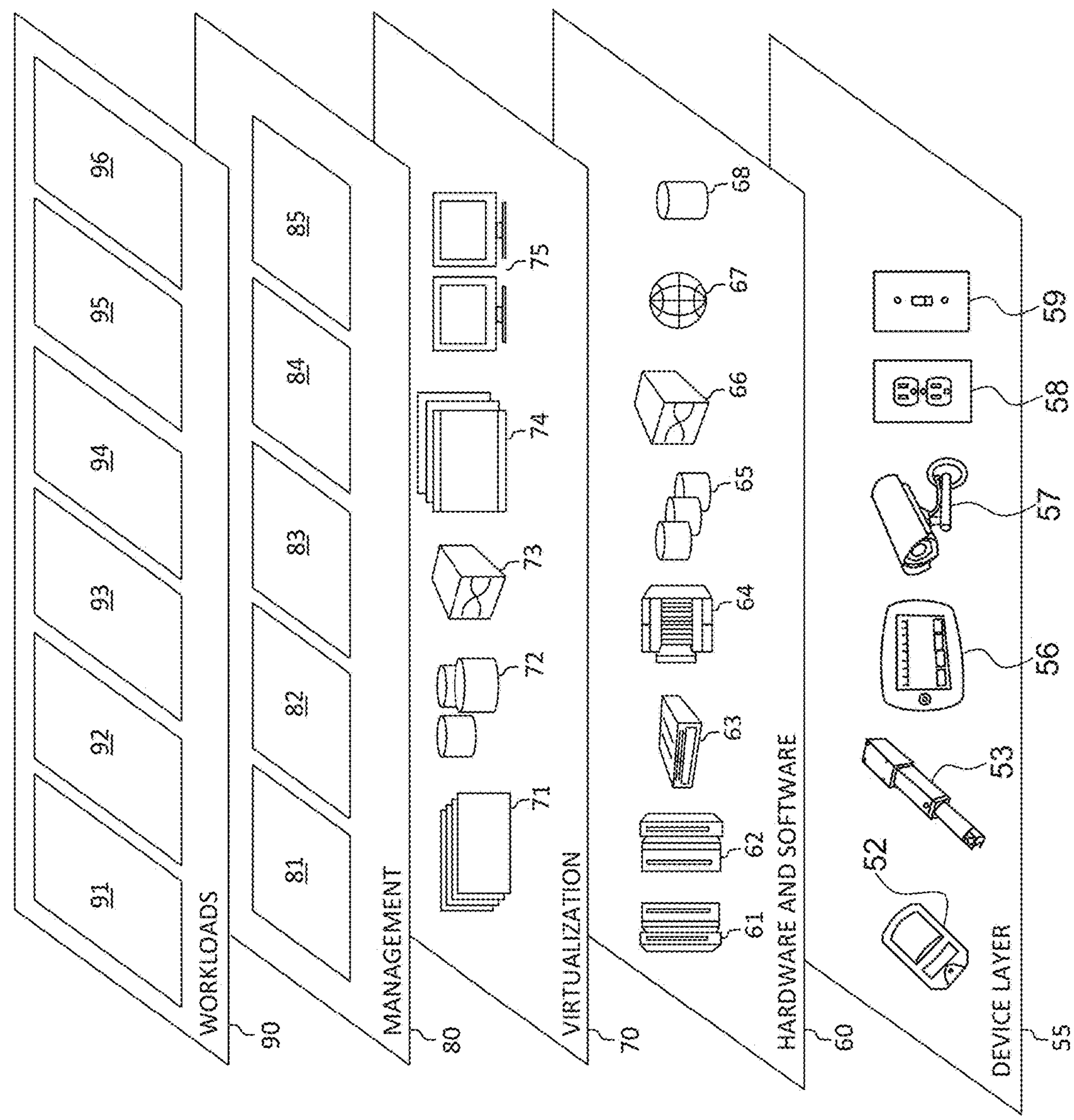
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices using image analysis workloads and functions 96. In addition, configuring settings for various computer-controlled devices using image analysis workloads and functions 96 may include such operations as data analysis (including data collection and processing from various environmental sensors), image analysis, task and device analysis, and/or data analytics functions. One of ordinary skill in the art will appreciate that the configuring settings for various computer-controlled devices using image analysis workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
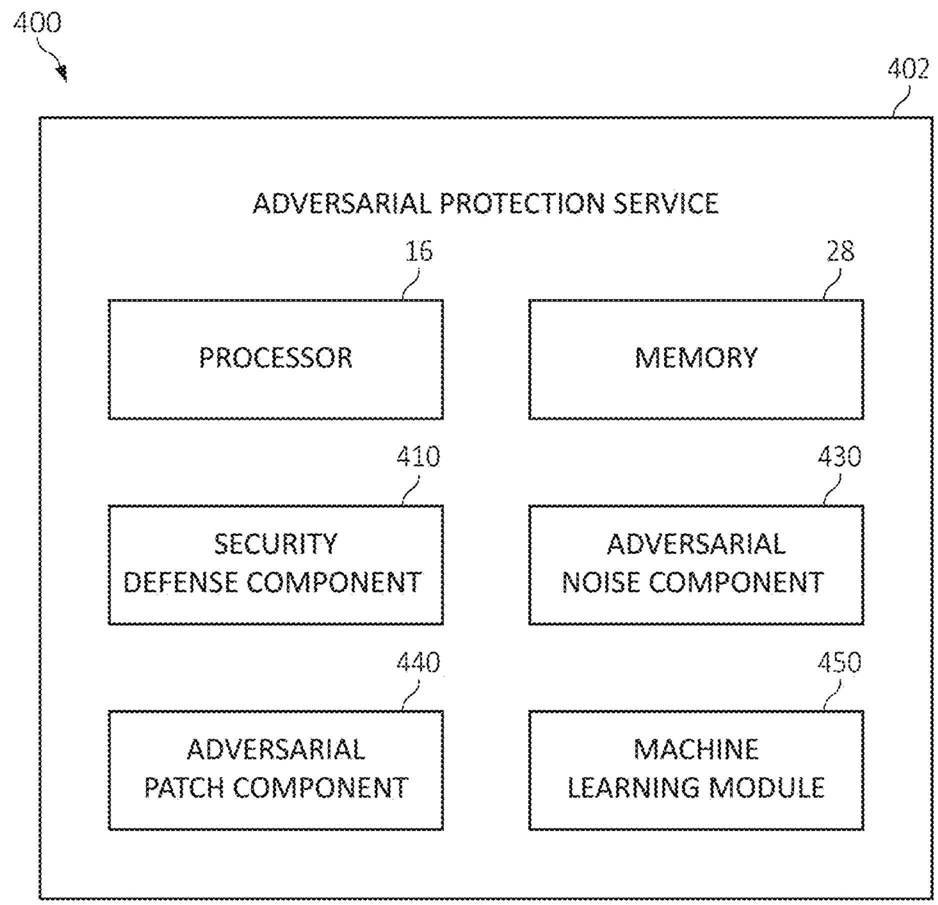
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. In one aspect, each of the devices, components, modules, and/or functions described in FIGS. 1-3 may also apply to the devices, components, modules, and functions of FIG. 4. Also, one or more of the operations and steps of FIGS. 1-3 may also be included in one or more operations or actions of FIG. 4. Computer system/server 12 is again shown, incorporating processing unit 16 to perform various computational, data processing and other functionality in accordance with various aspects of the present invention. An adversarial protection service 402 is shown, along with a security defense component 410, an adversarial noise component 430, an adversarial patch component 440, and/or a machine learning model 450, each of which may be associated with the central server, the cloud computing network, the local area network server, and/or the computing system of the IoT devices including an image capturing device In one aspect, the security defense component 410 may provide security defenses on one or more image display devices against automated media analysis by using adversarial noise, an adversarial patch, or a combination thereof. In one aspect, the one or more image display devices may be computing systems such as, for example, a smart phone, video camera, a camera, a tablet, computers, handheld devices, IoT device, and/or other type of electronic screen device that may include one or more GUI's, and the like (as illustrated in FIGS. 1-3). The image capturing device/IoT devices may be connected via communications channels (e.g., bus 18 of FIG. 1 or other network such as a cloud computing network) through the network to the computer system/server 12 of FIG. 1. In one exemplary embodiment, a user may find themselves in a location where they desire to display data on an image display/capturing devices. The image capturing device 408 of the user may have already located, and connected to, a wireless network. The image capturing device/IoT devices may then connect through a local wireless network through the Internet to the computer system/server 12 to provide context metadata and, in turn, receive settings information and/or instructions from the computer system/server 12 of FIG. 1.

In one aspect, the adversarial protection service 402 may be external to and/or included within the image capturing device/IoT devices. The image capturing device/IoT devices may incorporate additional functional components 400 as previously described and may be used herein merely for illustrative convenience as a variety of functional components 400 to accomplish specific functionality to further the mechanisms of the illustrated embodiments.

The security defense component 410, in association with the adversarial noise component 430, may apply the adversarial noise to one or more display frames of the one or more image display devices. Alternatively, the security defense component 410, in association with the adversarial patch component 440, may apply the adversarial patch to one or more display frames of the one or more image display devices.

In so doing, the adversarial noise component 430 may determine or select a type of the adversarial noise to implement on the one or more image display devices. The adversarial patch component 440 may determine or select a type of the adversarial patch to implement on the one or more image display devices. Also, the adversarial patch component 440 may create and/or load the adversarial patch onto the one or more image display devices.

The security defense component 410 may estimate a degree of security defense strength of the adversarial noise, the adversarial patch, or a combination thereof. The security defense component 410, in association with the machine learning module 450, may estimate a degree of security defense strength of the adversarial noise, the adversarial patch, or a combination thereof via a feedback loop operation. In one aspect, the machine learning module 450 may be initialized and configured for implementing the feedback loop operation.

The security defense component 410, which may include the machine learning module 540, may adjust a degree of security defense strength of the adversarial noise, the adversarial patch, or a combination thereof.

Figure 5A:
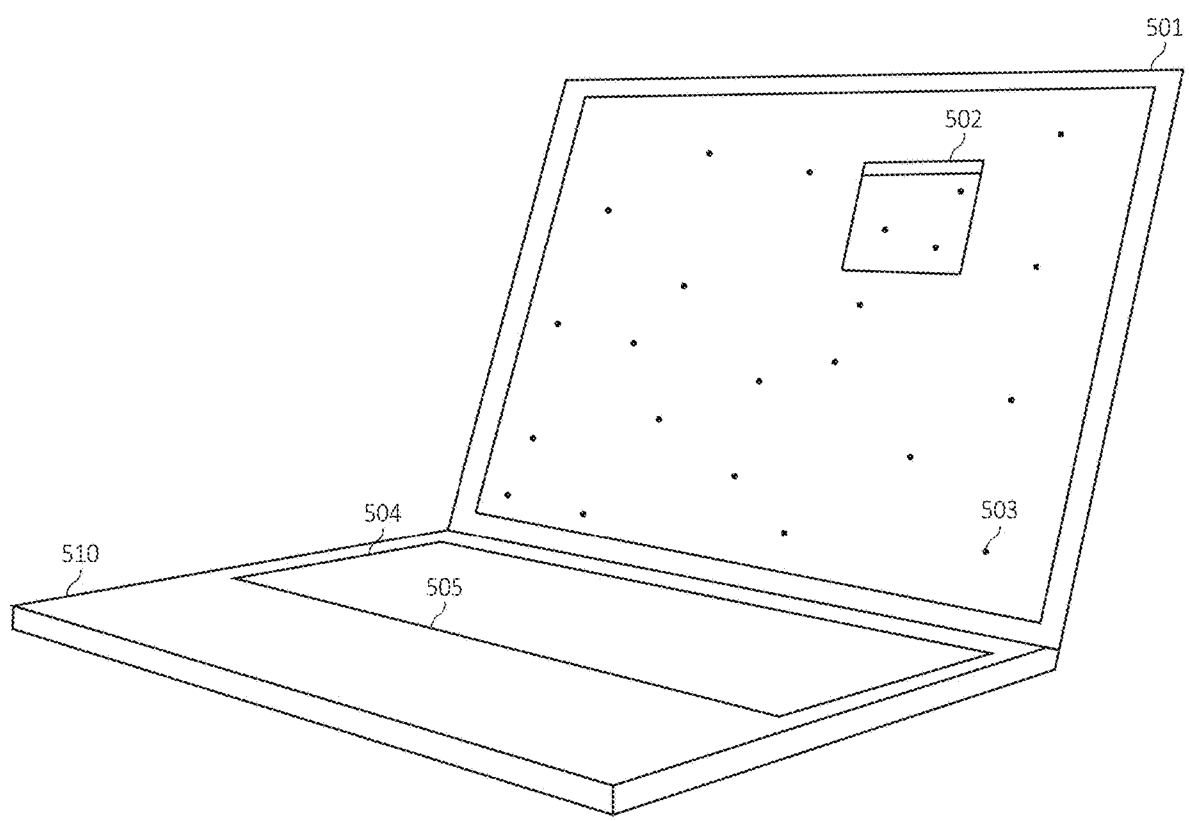
FIG. 5A is an additional block diagram depicting exemplary operations for providing adversarial protection for various computer-controlled screen/devices using adversarial noise in which aspects of the present invention may be realized.
Figure 5B:
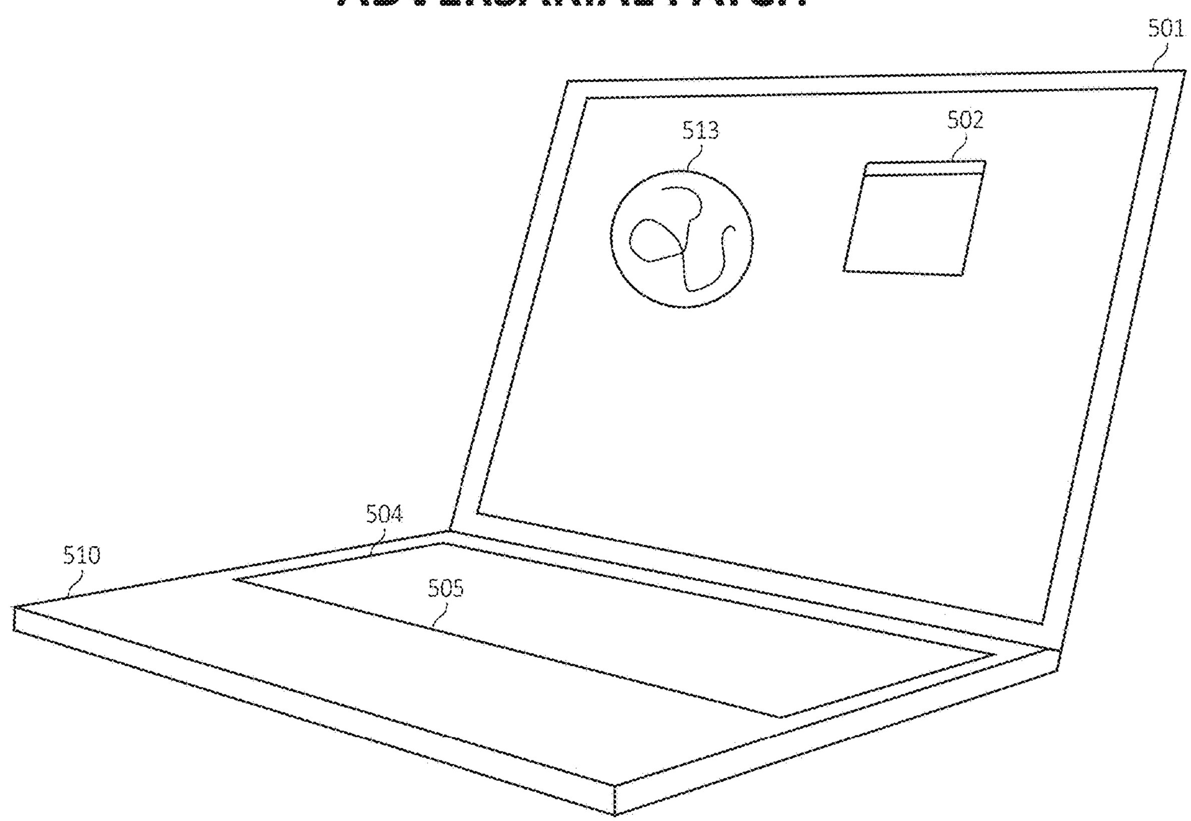
FIG. 5B is an additional block diagram depicting exemplary operations for providing adversarial protection for various computer-controlled screen/devices using adversarial patches in which aspects of the present invention may be realized.

Turning now to FIGS. 5A-5B, mechanisms of the various embodiments are depicted for implementing adversarial noise (see FIG. 5A) and/or adversarial patches (see FIG. 5B). For example, FIG. 5A is a block diagram depicting exemplary operations of a computing system 500 for providing adversarial protection for various computer-controlled screen/devices using adversarial noise and FIG. 5B depicts the computing system 500 for providing adversarial protection for various computer-controlled screen/devices using adversarial patches. Also, one or more components, functionalities, and/or features of FIGS. 1-4 may be implemented in FIGS. 5A-5B. Repetitive description of like elements, components, modules, services, applications, and/or functions employed in other embodiments described herein is omitted for sake of brevity.

As illustrated in FIG. 5A-5B, a computing system 500 (e.g., a computing display/screen 500 is depicted. The computing display/screen 500 may be an electronic device with screen such as, for example, a computer, tablet, notebook, smart phone, etc. The computing display/screen 502 includes a display 501 (e.g., GUI, screen, projection, etc.) that is capable and/or configured for displaying one or more objects 502 (e.g., images, graphs, text data, etc.) on the display 501. The display 501 may also include one or more other types of objects 502 for displays such as, for example, a window, mouse cursor, etc.

As indicated in FIG. 5A, the computing display/screen 500 is configured and enabled to create, generate, and/or provide adversarial defense noise for implementation on the display 501. The computing display/screen 500 may modify one or more sections of the display 501 such as, for example, modifying one or more pixels 503 using the adversarial defense noise.

As indicated in FIG. 5B, the computing display/screen 500 may also be configured and enabled to create, generate, and/or provide adversarial defense patch for implementation on the display 501. The computing display/screen 500 may modify one or more sections of the display 501 such as, for example, modifying one or more adversarial patches 513 (or "adversarial defense patch").

As indicated in FIG. 5A, the computing display/screen 500 may include one or more input devices such as, for example, input devices 504 for setting and/or adjusting the adversarial defense noise strength such as, for example, a fraction of pixels affected, a maximum pixel change allowed, etc. The input devices 504 may be a button, switch, electronic pad, scanning device, or other mechanism associated with a computer for receiving input. As indicated in FIG. 5B, the computing display/screen 500 may include the one or more input devices such as, for example, input devices 504 for setting and/or adjusting the adversarial defense patch strength such as, for example, defining a patch size, transparency, patch content, or other patch related data/information relating to the adversarial defense patch strength. The input devices 504 of FIGS. 5A-5B may be a button, switch, electronic pad, scanning device, or other mechanism associated with a computer for receiving input.

As indicated in FIGS. 5A-5B, the computing display/screen 500 may also include an output device 505 for reporting adversarial defense noise strength such as, for example, reporting as icon or percentage number in a task bar, push notification, hardware indicators, etc. As indicated in FIG. 5B, the computing display/screen 500 may also include an output device 505 for reporting adversarial defense noise strength such as, for example, reporting as icon or percentage number in a task bar, push notification, hardware indicators, etc.

Figure 6:
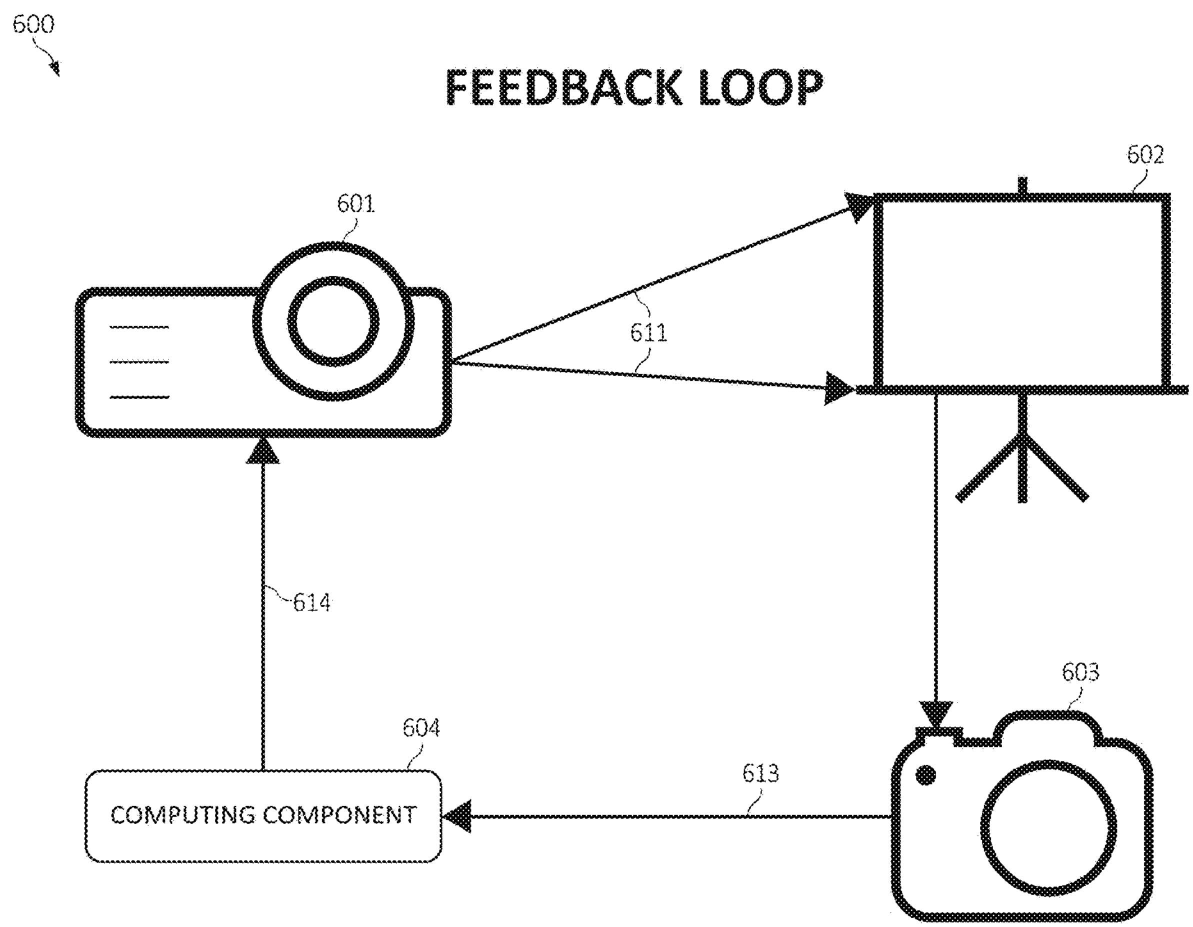
FIG. 6 is an additional block diagram depicting exemplary operations for providing adversarial protection for various computer-controlled screen/devices using a feedback-loop in which aspects of the present invention may be realized.

Turning now to FIG. 6, computing system 600 depicts exemplary operations for providing adversarial protection for various computer-controlled screen/devices using a feedback-loop. In one aspect, one or more components, functionalities, and/or features of FIGS. 1-5A and 5B may be implemented in FIG. 6. Repetitive description of like elements, components, modules, services, applications, and/or functions employed in other embodiments described herein is omitted for sake of brevity.

In one aspect, the computing system 600 may include a displaying component 601 (e.g., a projector or GUI), a screen 602, a computing component 603, and/or a camera 604, each of which individually and/or collectively assist with form a feedback loop. As depicted, a feedback loop can also include an expectation over transformation operation/algorithm, which samples one or more transformations of a rendered screen (e.g., the screen 602) as it could be experienced by an external recording device attacking the screen (e.g., the screen 602). The feedback loop may serve to further strengthens the adversarial noise/patch defense and allows more accurate assessment of the adversarial noise/patch defense strength.

In operation, the displaying component 601 may projects an output on an external surface, as in step 611. The camera 604 may capture the projected output, as in step 612. Feedback (e.g., a displayed frame captured by the camera 604) may be provided to the computing component 601, as in step 613. The computing component 601 may use the feedback to determine the adversarial noise/patch defense strength and adapts the adversarial noise/patch defense if necessary.

For example, the computing device 604 contains a benign image (e.g. slide, frame, photo, etc.) to be projected by 601 to the screen 602. The computing device 604 may contain, for example, a neural network image classifier and analyze the content of the benign image (e.g. classify that the current frame contains a cat, etc.). The computing device 604 then adds adversarial noise and repeats the same analysis with the image classifier using the benign image modified by the adversarial noise. If, for example, a classifier now predicts that the frame is empty or shows an object (e.g., a car), the computing device 604 knows that the current adversarial noise is successfully fooling the image classifier it has used and therefore that most likely any similar image classifier will be fooled too. Repeating this analysis over many frames allows the algorithm to calculate an error rate of fooling the image classifier, and this rate is proportional to the defense strength, which means how often the image classifier cannot classify the frame content correctly.

Figure 7:
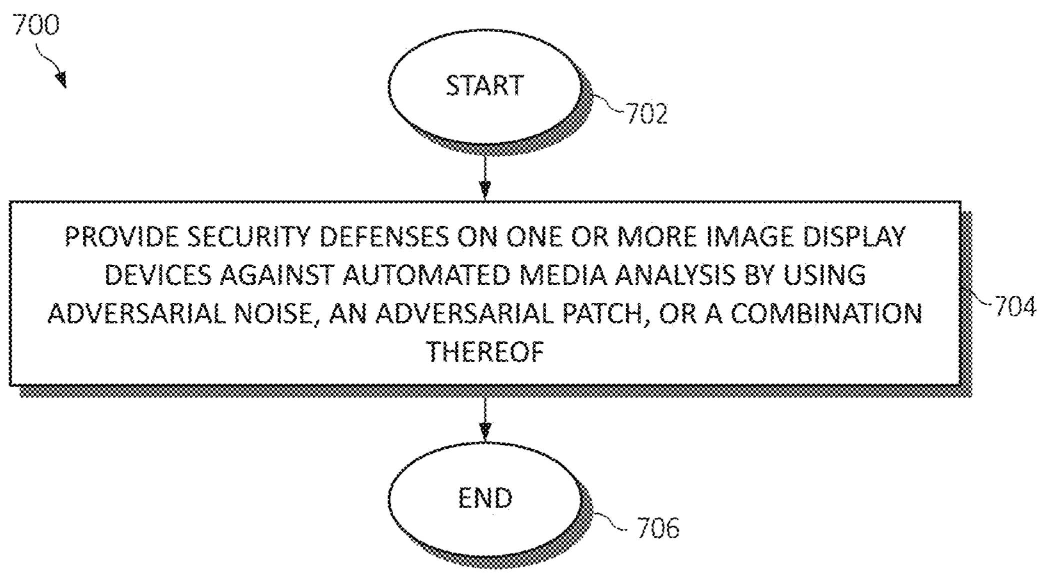
FIG. 7 is a flowchart diagram depicting an exemplary method for providing adversarial protection for various computer-controlled screen/devices by a processor; again in which aspects of the present invention may be realized.

Turning now to FIG. 7, a method 700 for providing adversarial protection for various computer-controlled screen/devices by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

Security defenses may be provided on one or more image display devices against automated media analysis by using adversarial noise, an adversarial patch, or a combination thereof, as in block 704. The functionality 700 may end in block 706.

Figure 8:
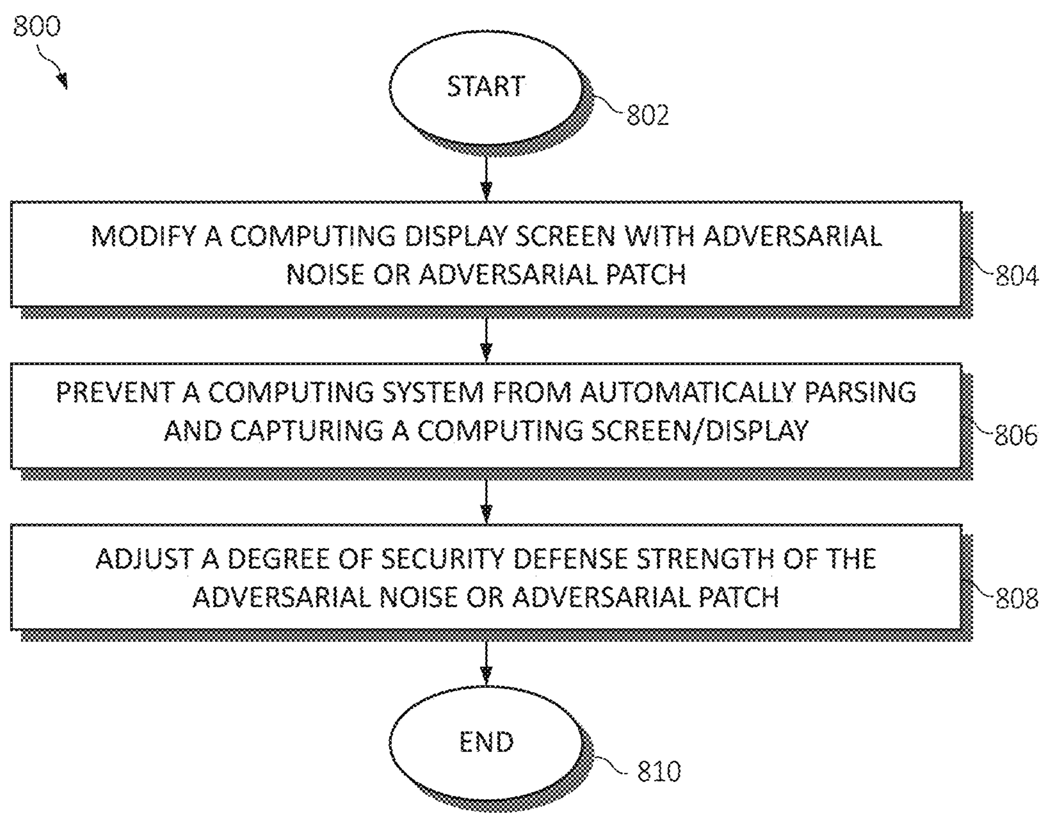
FIG. 8 is an additional flowchart diagram depicting an exemplary method for providing adversarial protection for various computer-controlled screen/devices by a processor; again in which aspects of the present invention may be realized.

Turning now to FIG. 8, an additional method 800 providing adversarial protection for various computer-controlled screen/devices by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

A computing display (e.g., an electronic screen or display) may be modified with adversarial noise or adversarial patch (or both), as in block 804. A computing system (e.g., a computing system attempting to attack the computing display) may be prevent from automatically parsing and capturing a computing screen/display (using the adversarial noise, adversarial patch, and/or both), as in block 806. A degree of security defense strength of the adversarial noise or adversarial patch may be adjusted, as in block 808. The functionality 800 may end in block 810.

In one aspect, in conjunction with and/or as part of at least one block of FIGS. 7 and/or 8, the operations of methods 700 and/or 800 may include each of the following. The operations of methods 700 and/or 800 may apply the adversarial noise, the adversarial patch, or a combination thereof to one or more display frames of the one or more image display devices. The operations of methods 700 and/or 800 may determine or select a type of the adversarial noise to implement on the one or more image display devices, and/or create or load the adversarial patch onto the one or more image display devices.

The operations of methods 700 and/or 800 may estimate a degree of security defense strength of the adversarial noise, the adversarial patch, or a combination thereof, and/or estimate a degree of security defense strength of the adversarial noise, the adversarial patch, or a combination thereof via a feedback loop operation. The operations of methods 700 and/or 800 may adjust a degree of security defense strength of the adversarial noise, the adversarial patch, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for providing adversarial protection to computing display devices, comprising:
- providing security defenses on one or more image display devices of a first computing device against automated media analysis by using an adversarial noise, an adversarial patch, or a combination thereof, wherein the adversarial noise, the adversarial patch, or the combination thereof is recursively applied to each of a plurality of frames generated by the one or more display devices in real-time such that each currently displayed frame rendered by the one or more display devices contains the adversarial noise, the adversarial patch, or the combination thereof at a given strength computed for the currently displayed frame; and
- executing machine learning logic to perform the computing of the given strength of the adversarial noise, the adversarial patch, or the combination thereof applied to each currently displayed frame rendered by the one or more display devices, wherein the given strength is determined by implementing a feedback loop operation by the machine learning logic to analyze an output of one or more previously displayed frames captured by a second computing device.

2. The method of claim 1, further including determining or selecting a type of the adversarial noise to implement on the one or more image display devices.

3. The method of claim 1, further including creating or loading the adversarial patch onto the one or more image display devices.

4. The method of claim 1, wherein analyzing the output further includes estimating an amount of which the adversarial noise, the adversarial patch, or a combination thereof affects a display quality of images output by the one or more image display devices.

5. The method of claim 1, further including adjusting an amount of which the adversarial noise, the adversarial patch, or a combination thereof affects a display quality of images output by the one or more image display devices.

6. A system for providing adversarial protection to computing display devices, comprising:

one or more computers with executable instructions that when executed cause the system to:

provide security defenses on one or more image display devices of a first computing device against automated media analysis by using an adversarial noise, an adversarial patch, or a combination thereof, wherein the adversarial noise, the adversarial patch, or the combination thereof is recursively applied to each of a plurality of frames generated by the one or more display devices in real-time such that each currently displayed frame rendered by the one or more display devices contains the adversarial noise, the adversarial patch, or the combination thereof at a given strength computed for the currently displayed frame; and executing machine learning logic to perform the computing of the given strength of the adversarial noise, the adversarial patch, or the combination thereof applied to each currently displayed frame rendered by the one or more display devices, wherein the given strength is determined by implementing a feedback loop operation by the machine learning logic to analyze an output of one or more previously displayed frames captured by a second computing device.

7. The system of claim 6, wherein the executable instructions determine or select a type of the adversarial noise to implement on the one or more image display devices.

8. The system of claim 6, wherein the executable instructions create or load the adversarial patch onto the one or more image display devices.

9. The system of claim 6, wherein analyzing the output further includes an amount of which the adversarial noise, the adversarial patch, or a combination thereof affects a display quality of images output by the one or more image display devices.

10. The system of claim 6, wherein the executable instructions adjust an amount of which the adversarial noise, the adversarial patch, or a combination thereof affects a display quality of images output by the one or more image display devices.

11. A computer program product, for providing adversarial protection by one or more processors, the computer program product comprising a non-transitory computer-readable storage medium having computer-readable program code portions stored therein, the computer-readable program code portions comprising:

an executable portion that provides security defenses on one or more image display devices of a first computing device against automated media analysis by using an adversarial noise, an adversarial patch, or a combination thereof, wherein the adversarial noise, the adversarial patch, or the combination thereof is recursively applied to each of a plurality of frames generated by the one or more display devices in real-time such that each currently displayed frame rendered by the one or more display devices contains the adversarial noise, the adversarial patch, or the combination thereof at a given strength computed for the currently displayed frame; and executing machine learning logic to perform the computing of the given strength of the adversarial noise, the adversarial patch, or the combination thereof applied to each currently displayed frame rendered by the one or more display devices, wherein the given strength is determined by implementing a feedback loop operation by the machine learning logic to analyze an output of one or more previously displayed frames captured by a second computing device.

12. The computer program product of claim 11, further including an executable portion that determines or select a type of the adversarial noise to implement on the one or more image display devices.

13. The computer program product of claim 11, further including an executable portion that creates or loads the adversarial patch onto the one or more image display devices.

14. The computer program product of claim 11, wherein analyzing the output further includes estimating an amount of which the adversarial noise, the adversarial patch, or a combination thereof affects a display quality of images output by the one or more image display devices.

15. The computer program product of claim 11, further including an executable portion that adjusts an amount of which the adversarial noise, the adversarial patch, or a combination thereof affects a display quality of images output by the one or more image display devices.

* * * * *